(12) United States Patent
Van Hardeveld

(10) Patent No.: US 7,795,318 B2
(45) Date of Patent: Sep. 14, 2010

(54) MULTI STAGE FISCHER-TROPSCH PROCESS

(75) Inventor: Robert Martijn Van Hardeveld, Rotterdam (NL)

(73) Assignee: Shell Oil Company, Houston, TX (US)

( * ) Notice: Subject to any disclaimer, the term of this patent is extended or adjusted under 35 U.S.C. 154(b) by 289 days.

(21) Appl. No.: 11/988,964

(22) PCT Filed: Jul. 14, 2006

(86) PCT No.: PCT/EP2006/064272
§ 371 (c)(1),
(2), (4) Date: Jan. 17, 2008

(87) PCT Pub. No.: WO2007/009952
PCT Pub. Date: Jan. 25, 2007

(65) Prior Publication Data
US 2009/0234031 A1 Sep. 17, 2009

(30) Foreign Application Priority Data
Jul. 20, 2005 (EP) .................................. 05254508

(51) Int. Cl.
C07C 27/00 (2006.01)
(52) U.S. Cl. .................. 518/706; 518/700; 518/702; 518/703; 518/704; 518/705; 518/715
(58) Field of Classification Search ............... 518/700, 518/702, 703, 704, 705, 706, 715
See application file for complete search history.

(56) References Cited
U.S. PATENT DOCUMENTS
6,310,108 B1   10/2001   Bonneau et al. ............. 518/700

2003/0050348 A1   3/2003   Kennedy ................... 518/702

FOREIGN PATENT DOCUMENTS

| EP | 178007 | 4/1986 |
|---|---|---|
| EP | 1219566 | 7/2002 |
| GB | 2409460 | 6/2005 |
| WO | WO03010117 | 2/2003 |
| WO | WO03083013 | 10/2003 |
| WO | WO2004026994 | 4/2004 |

OTHER PUBLICATIONS

Kuhre, C.J, et al.: "Partial Oxidation Grows Stronger in U.S.", Oil & Gas Journal, Sep. 6, 1971, vol. 69, No. 36, pp. 85-90.

*Primary Examiner*—Jafar Parsa

(57) ABSTRACT

A multi-stage process for the production of hydrocarbon products from syngas, each stage of the process comprising one or more syngas conversion reactors in which syngas is partially converted into hydrocarbon products at conversion conditions, each conversion reactor having a syngas entry stream system which system combines two or more entry streams of syngas and which system delivers the combined syngas to the syngas conversion reactor, the syngas entry system combining at least one entry stream of syngas being a syngas stream obtained in a partial oxidation process (for the first stage) or an exit stream of syngas from the previous stage, together with a reformed syngas (for all stages except the first stage), with another syngas stream being a recycle stream from the conversion reactor and a syngas exit stream system which discharges an exit stream of syngas from the reactor, the exit stream partly being used as the recycle stream to the syngas entry system as mentioned above, and, in the case that there is a further stage in the process, as feed for the next stage.

10 Claims, 1 Drawing Sheet

MULTI STAGE FISCHER-TROPSCH PROCESS

The present application claims priority to European Patent Application 05254508.4 filed 20 Jul. 2005.

FIELD OF THE INVENTION

The present invention relates to a multi-stage Fischer-Tropsch process for the production of hydrocarbon products from syngas.

BACKGROUND OF THE INVENTION

Various processes are known for the conversion of hydrocarbonaceous feedstocks, especially methane from natural sources, for example natural gas, associated gas and/or coal bed methane, into liquid products, especially methanol and liquid hydrocarbons, particularly paraffinic hydrocarbons. At ambient temperature and pressure these hydrocarbons may be gaseous, liquid and (often) solid. Such processes are often required to be carried out in remote and/or offshore locations, where no direct use of the gas is possible. Transportation of gas, for example through a pipeline or in the form of liquefied natural gas, requires extremely high capital expenditure or is simply not practical. This holds true even more in the case of relatively small gas production rates and/or fields. Re-injection of gas will add to the costs of oil production, and may, in the case of associated gas, result in undesired effects on crude oil production. Burning of associated gas has become an undesirable option in view of depletion of hydrocarbon sources and air pollution. A process often used for the conversion of carbonaceous feedstocks into liquid and/or solid hydrocarbons is the well-known Fischer-Tropsch process.

For a general overview for the Fischer-Tropsch process reference is made to Fischer-Tropsch Technology, Studies in Surface Science and Catalysis, Vol. 152, Steynberg and Dry (ed.) Elsevier, 2004, Amsterdam, 0-444-51354-X. Reference is further made to review articles in Kirk Othmer, Encyclopedia of Chem. Techn. and Ullmann's Encyclopedia of Ind. Chem.

The Fischer-Tropsch process can be used for the conversion of hydrocarbonaceous feed stocks into especially liquid and/or solid hydrocarbons. The feed stock (for example natural gas, associated gas, coal-bed methane, residual (crude) oil fractions, peat, biomass or coal) is converted in a first step into a mixture of hydrogen and carbon monoxide (this mixture is referred to as synthesis gas or syngas). The syngas is then converted in one or more steps over a suitable catalyst at elevated temperature and pressure into mainly paraffinic compounds ranging from methane to high molecular weight molecules comprising up to 200 carbon atoms, or, under particular circumstances, even more.

Depending on the catalyst and the process conditions used in the Fischer-Tropsch reaction, normally gaseous hydrocarbons, normally liquid hydrocarbons and optionally normally solid hydrocarbons are obtained. It is often preferred to obtain a large fraction of normally solid hydrocarbons. In that case a high selectivity to $C_5+$-hydrocarbon is obtained. These solid hydrocarbons may be obtained up to 85 wt % based on total hydrocarbons, usually between 50 and 75 wt %. The term "normally" relates to STP-condition (i.e. 0° C., 1 bar).

The partial oxidation of gaseous feedstocks, producing mixtures of especially carbon monoxide and hydrogen, can take place according to various established processes. These processes include the Shell Gasification Process. A comprehensive survey of this process can be found in the Oil and Gas Journal, Sep. 6, 1971, pp 86-90.

Generally, the partial oxidation process looks to convert natural gas, which is mainly methane, to the carbon monoxide and hydrogen mixture known as syngas. Pure methane would create a theoretical hydrogen to carbon monoxide (hereinafter termed "$H_2/CO$") molar ratio of 2, but because natural gas includes other compounds such as ethane, and because sometimes excess oxygen is used to try and achieve substantial, close or near 100% conversion of the methane, the actual $H_2/CO$ ratio in syngas is usually less than 2, such as 1.7-1.8. In the case of residual oil fractions, peat, (brown) coal and biomass the $H_2/CO$ ratio is usually between 1.7 and 0.6.

The Fischer-Tropsch (FT) process may be operated in a single pass mode ("once through") or in a recycle mode. In either configuration, there is usually only one syngas entry stream into the process reactor or reactors. Meanwhile, it is desired to obtain an overall CO conversion level or percentage as high as possible.

SUMMARY OF THE INVENTION

The present invention concerns a multi-stage process for the production of hydrocarbon products from syngas, each stage of the process comprising 1) providing one or more syngas conversion reactors in which syngas is partially converted into hydrocarbon products at conversion conditions, 2) each conversion reactor having a syngas entry stream system which system combines two or more entry streams of syngas and which system delivers the combined syngas to the syngas conversion reactor, the syngas entry system combining A) at least one entry stream of syngas being a syngas stream obtained in a partial oxidation process and having a hydrogen/carbon monoxide (H2/CO) ratio between 1.6 and 2.0 (for the first stage) or B) an exit stream of syngas from the previous stage, the $H_2/CO$ ratio of the exit stream of syngas being between 0.2 and 0.9, preferably between 0.3 and 0.7, together with a reformed syngas having an $H_2/CO$ ratio of at least 3.0, preferably between 4.0 and 8.0, more preferably between 5 and 6, (for all stages except the first stage), with another syngas stream being a recycle stream from the conversion reactor having an H2/CO ratio between 0.2 and 0.9, preferably between 0.3 and 0.7, the combined syngas having an $H_2/CO$ ratio between 1.0 and 1.6, preferably between 1.1 and 1.5, and 3) a syngas exit stream system which discharges an exit stream of syngas from the reactor, the $H_2/CO$ ratio of the exit stream of syngas being between 0.2 and 0.9, preferably between 0.3 and 0.7, the exit stream partly being used as the recycle stream to the syngas entry system as mentioned above, and, in the case that there is a further stage in the process, as feed for the next stage.

DETAILED DESCRIPTION OF THE INVENTION

Figure 1:
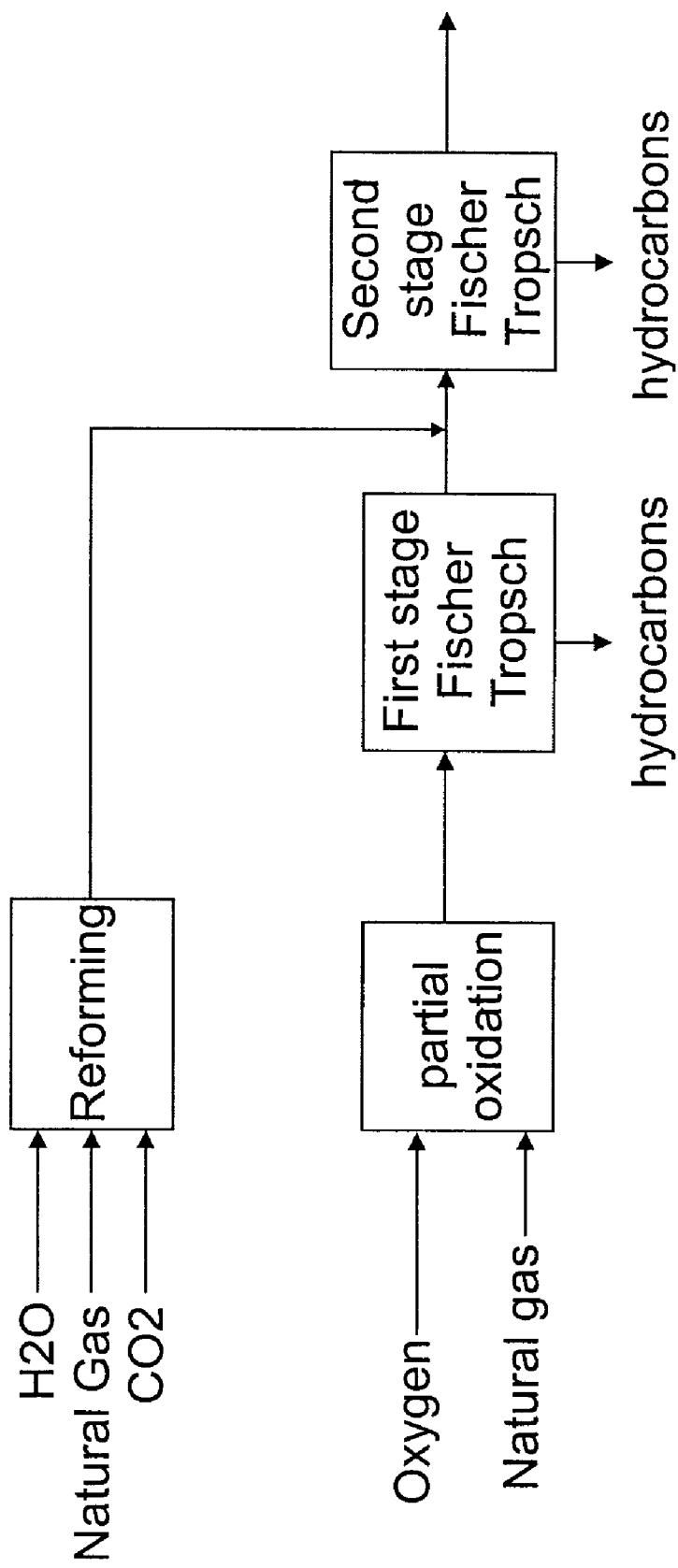
FIG. 1 is a schematic flow diagram of an embodiment of the present invention.

A multi-stage conversion process wherein an entry stream for the second, third, fourth stages, etc. is enriched with hydrogen provides the ability to adjust the CO conversion level at each stage and to increase the overall CO conversion as well as to increase the $C_5+$-selectivity of the process. This therefore gives greater flexibility for the user to select operational parameters, including the yield and quality of hydrocarbon products formed by the process. It is observed that the combined syngas stream for each stage is in the range of 1.0 to 1.6. This results in the highest $C_5+$-selectivity and an optimum CO conversion.

In the process of the invention, in each stage, at least two syngas streams (entry streams of syngas) are combined in the syngas entry system. This can be done by simply adding the two or more streams to a combined stream, e.g. two or more pipes feeding into a common header. It is also possible to use a mixing vessel. If desired one or more (static) mixers may be used. From the syngas entry system one or more reactors are fed with the combined syngas. Standard valves, flow controllers etc. may be used. In the syngas exit stream system the syngas discharged from the reactor is collected. In the case of more than one reactor in the same stage, the several reactor exit streams may be combined. Before or after the syngas exit stream system the gas stream may be cooled to separate liquid reaction products (e.g. water and liquid hydrocarbon). Preferably the streams are cooled before the syngas exits system. Cooling is preferably to a temperature between 25 and 75° C. in order to remove a substantial part of the water and the $C_5+$ hydrocarbons e.g. at least 90 wt % of both streams. Combination of more than one syngas exit streams may be done by feeding the streams to a combined stream, e.g. two (or more) pipes feeding into a common header. It is also possible to use a mixing vessel. If desired, a (static) mixer may be used. In each stage the recycle syngas stream may be a recycle stream over one conversion reactor. In the case of two or more conversion reactor either two or more recycles may be used. It is also possible to combine the recycles over two or more reactors, preferably over all reactors. In the case of a combined recycle it is advantageous to combine the individual conversion reactor exit stream of syngas in the syngas exit stream system.

The addition of the reformed syngas may be to the exit syngas stream of the previous stage or to the recycle stream of the same stage, or it may be done at the same time of the mixing of the exit stream and the recycle stream or after mixing the exit stream and the recycle stream.

At each stage of the process involving syngas conversion, there is a syngas entry stream system having a certain $H_2/CO$ ratio and an exit stream system having an $H_2/CO$ ratio. In general, the overall $H_2/CO$ ratio of the entry stream system into each stage is approximately 1.6-2.0, preferably 1.7-1.9 (either after the partial oxidation reaction and optional $H_2/CO$ adaption for the first stage or after the combination of recycle gas and reformed syngas for the other stages), and the overall $H_2/CO$ ratio of the exit stream system from each stage will generally be 0.2-0.9, preferably 0.3-0.7, more preferably 0.4-0.5.

In general, the $H_2/CO$ ratio in each entry stream system is below the consumption ratio in a hydrocarbon forming process such as the Fischer-Tropsch reaction, and a low $H_2/CO$ ratio improves the C5+ selectivity. Such a reaction, especially when using for example a cobalt catalyst, generally follows the equation:

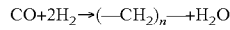
$$CO+2H_2 \rightarrow (\text{---} CH_2)_n \text{---} + H_2O$$

In the above, the theoretical $H_2$ to CO ratio is just above 2, and so it is generally desired to achieve a ratio of hydrogen to carbon monoxide actually used in the reactor as close as possible to 2, in order to get the best selectivity. The actual ratio of hydrogen to carbon monoxide used in the reactor, based on analysis of the products formed, is known as the 'consumption ratio'. The actual consumption ratio depends upon all the factors, parameters and conditions in a Fischer-Tropsch reactor.

As mentioned above, the $H_2/CO$ ratio in syngas formed from natural gas is generally approximately 1.6-2.0, often 1.7-1.9. Partial oxidation may be used, especially partial oxidation of natural gas. Also other feedstocks may be used, especially light feedstocks as LPG, residual oil fractions, peat, (brown) coal and biomass. It might be necessary to increase the $H_2/CO$ ratio of the syngas other than natural gas, for instance by shifting part of the syngas stream or combining with hydrogen rich streams. Such a mixing can be done before entrance to the syngas entry system or in the syngas entry system. In that case $H_2/CO$ ratio of the syngas stream is the ratio obtained after shifting, mixing etc.

Beside partial oxidation, also the combination of partial oxidation and reforming may be used, especially autothermal reforming. The partial oxidation may be a catalytic or a non-catalytic process.

In the case of partial oxidation and/or autothermal reforming the $H_2/CO$ ratio is in general between 1.6 and 2.0. in the case the $H_2/CO$ ratio would be outside this range, the process can be influenced for instance by the addition of water and/or CO2 or by the addition of higher hydrocarbons, e.g. propane, butane etc. For instance, addition of water results is a higher $H_2/CO$ ratio, addition of LPG to methane is a lower $H_2/CO$ ratio. Also the amount of oxygen may be charged or the temperature in the case of catalytic processes. These variations are well known to the person skilled in the art.

It is preferred in the process of the present invention to use non-catalytic partial oxidation. In this way a relatively pure $H_2/CO$ mixture is obtained containing a relatively low amount of $CO_2$. The amount of $CO_2$ is usually less than 4 vol %, and can easily be decreased to a value below 2 vol % or even less than 1.5 vol %. This is important as $CO_2$ is an inert in the Fisher-Tropsch reaction. As a recycle is used in the present invention these may result in the quick build up of inerts in the recycle, making a recycle for a further stage very difficult.

The present invention involves increasing the $H_2/CO$ ratio of the exit stream system from at least the first stage of the multi-stage process, in order to provide a syngas entry stream system into the next stage of the multi-stage process having an increased $H_2/CO$ ratio. Generally, this increases the potential CO conversion level in the next stage of the process.

"Reformed syngas" relates to syngas having a $H_2/CO$ ratio greater than 2, the theoretical ratio from the partial oxidation process as described above. The $H_2/CO$ ratio could be greater than 3, and even in the range 5-6.

There are a number of reforming processes known in the art for providing syngas, any one of which, or any combination thereof, is suitable for the present invention, as long as the reformed syngas provided fulfils the criteria of the present invention, in particular such that it has a higher $H_2/CO$ ratio than the overall $H_2/CO$ ratio of the exit stream system. Preferably, the reformed syngas has not been shifted to increase the hydrogen content. Preferably no purification is done to increase the hydrogen content.

One method of providing reformed syngas is Steam Methane Reforming (SMR). This provides a high $H_2/CO$ ratio through the reaction:

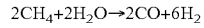
$$2CH_4+2H_2O \rightarrow 2CO+6H_2$$

The methane in the above reaction can be provided from natural gas, for example the same natural gas as is used to form the syngas. Whilst the above reaction gives a theoretical $H_2/CO$ ratio of 3, in fact secondary reactions, such as the reaction between carbon monoxide and water, increase the hydrogen content, and thus increase the $H_2$/CO ratio.

Preferably, where a SMR product stream is used, it is used directly, and without any further treatment, for example purification.

The use of SMR process provides a further benefit to the present invention. It provides an integrated process for syngas production and conversion of carbonaceous feedstocks to hydrocarbonaceous products (including for example light and heavy paraffins, methanol and the like). One of the advantages of such an integrated process is the ability to help balance the energy requirements/output of various steps of a Fischer-Tropsch plant or overall system, and thus improve the overall efficiency (in terms of carbon efficiency and thermal efficiency) of the Fischer-Tropsch process as a whole.

A further advantage provided by the present invention is that in integrating the syngas production and SMR processes, there is a reduction in the overall demand for oxygen in a hydrocarbon product plant, as the oxygen required in the SMR reaction can be provided from a superheated steam of the syngas production.

Generally, the CO conversion level during each stage of the multi-stage process of the present invention is approximately the same. Preferably, the CO conversion level during each stage of the multi-stage reaction is at least 50%, preferably 70-95%, and more preferably about 80%. Using a two stage process, 80% conversion at each stage provides an approximate 96% CO conversion level. Suitably the CO-conversion per pass for each stage of the process is between 20 and 55%, preferably 25-50%, more preferably 30-40%. The ratio "fresh" syngas/recycle syngas is suitably between 1 and 6, preferably between 2 and 5, more preferably 3 and 4. The CO-conversion can easily be changed by increasing or decreasing the reactor temperature and/or the reaction pressure.

The present invention provides a multi-stage process which may involve, two, three, or more stages, generally two.

In the present invention, one or more stages of the multi-stage process may be carried out in one or more parallel reactors.

The conditions and/or parameters for each stage of the multi-stage process of the present invention may be the same or different to those of other stages. Such differences include reactor temperatures and pressures used, the $H_2$/CO entry and exit ratios, as well as the type and amount of reformed syngas added.

One or more of the entry streams may be derived from a common source, and one or more of the exit streams may be combined.

The term "entry stream system" refers to the combined parameters of all the entry stream(s), which may still be physically distinct. Similarly, the term "exit stream system" refers to the combined parameters of all the exit stream(s).

In one embodiment of the present invention, all the entry streams for the first stage of the process are derived from a single source of syngas.

In another embodiment, two or more exit streams of each stage are combined to provide the entry stream(s) for a lesser number of reactors in the next stage.

One or more of the reactors of each stage may be supplied by one or more entry streams.

Each stage of the process of the present invention can have a number of reactors greater than the number of reactors in the next stage, for example 2-4 times as many, in a cascading manner such as the ratios 4-16:2-4:1 for a three stage process.

The hydrocarbonaceous feed suitably is methane, natural gas, associated gas or a mixture of $C_{1-4}$ hydrocarbons. The feed comprises mainly, i.e. more than 90 v/v %, especially more than 94%, $C_{1-4}$ hydrocarbons, and especially comprises at least 60 v/v percent methane, preferably at least 75%, more preferably 90%. Very suitably natural gas or associated gas is used. Suitably, any sulphur in the feedstock is removed.

The present invention also provides a hydrocarbon product or products whenever formed by a process as herein described, including any products made by hydroconversion of the hydrocarbon product(s). In particular, the present invention provides products generally formed by the Fischer-Tropsch process.

Products of the Fischer-Tropsch synthesis may range from methane to heavy paraffinic waxes. Preferably, the production of methane is minimised and a substantial portion of the hydrocarbons produced have a carbon chain of at least 5 carbon atoms. Preferably, the amount of $C_5+$ hydrocarbons is at least 60% by weight of the total product, more preferably, at least 70% by weight, even more preferably, at least 80% by weight, most preferably, at least 85% by weight.

Fischer-Tropsch catalysts are known in the art, and typically include a Group VIII metal component, preferably cobalt, iron and/or ruthenium, more preferably cobalt. Typically, the catalysts comprise a catalyst carrier. The catalyst carrier is preferably porous, such as a porous inorganic refractory oxide, more preferably alumina, silica, titania, zirconia or mixtures thereof. References to the Periodic Table herein refer to the previous IUPAC version of the Periodic Table of Elements such as that described in the 68th Edition of the Handbook of Chemistry and Physics (CPC Press).

The optimum amount of catalytically active metal present on the carrier depends inter alia on the specific catalytically active metal. Typically, the amount of cobalt present in the catalyst may range from 1 to 100 parts by weight per 100 parts by weight of carrier material, preferably from 10 to 50 parts by weight per 100 parts by weight of carrier material.

The catalyst suitably has an average diameter of 0.5-15 mm. One form of catalyst is as an extrudate. Such extrudates suitably have a length of 2-10 mm, especially 5-6 mm, and a cross section suitably of 1-6 $mm^2$, especially 2-3 $mm^2$.

The catalytically active metal may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, manganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

A most suitable catalyst comprises cobalt as the catalytically active metal and manganese and/or vanadium as a promoter.

The promoter, if present in the catalyst, is typically present in an amount of from 0.1 to 60 parts by weight per 100 parts by weight of carrier material. It will however be appreciated that the optimum amount of promoter may vary for the respective elements which act as promoter. If the catalyst comprises cobalt as the catalytically active metal and manganese and/or vanadium as promoter, the cobalt:(manganese+vanadium) atomic ratio is advantageously at least 12:1.

This invention especially concerns a process in which the catalyst in the first stage, preferably in all steps, is a cobalt base catalyst comprising a $C_5+$ enhancing promoter, especially a non-noble metal, preferably zirconium, tantalum, manganese, vanadium or scandium.

The Fischer-Tropsch synthesis is preferably carried out at a temperature in the range from 125° C. to 350° C., more preferably 175° C. to 275° C., most preferably 200° C. to 260° C. The pressure preferably ranges from 5 to 150 bar abs., more preferably from 5 to 80 bar abs.

The gaseous hourly space velocity may vary within wide ranges and is typically in the range from 500 to 10,000 Nl/l/h, preferably in the range from 1000 to 4,000 Nl/l/h.

It will be understood that the skilled person is capable to select the most appropriate conditions for a specific reactor configuration and reaction regime. These include possible recycling of formed products such as gases and waxes.

Without wishing to be restricted to a particular embodiment, the invention will now be described in further detail with reference to the accompanying drawing.

FIG. 1 shows a suitable arrangement combining the use of natural gas into two streams, one for a reforming process and one for a partial oxidation process. The partial oxidation process may be the Shell Gasification Process (SGP) as hereinbefore described.

The $H_2/CO$ ratio from the partial oxidation process is generally in the range 1.7-1.9, and this can be reduced to a ratio of 1.4 or lower by the recycle of exit stream from the first stage of the Fischer-Tropsch reaction.

The reforming process provides a reformed syngas having a high hydrogen-content stream, possibly having a $H_2/CO$ ratio of 5 or 6. It may be desired to use some of the reformed syngas for other parts or processes of the plant or facility. Reformed syngas can be used as a source of an enriched hydrogen stream, for example if the CO is removed by a suitable process such as swing pressure adsorption (PSA).

The introduction of this reformed syngas into the exit stream system from the first stage Fischer-Tropsch reaction increases the $H_2/CO$ ratio to a stage where it is similar to that of the $H_2/CO$ ratio in the syngas entry stream system into the first stage, such as 1.4-1.5. Thus, there will be better or higher conversion of the remaining carbon monoxide in the syngas, thereby increasing the CO conversion level in the overall multi-stage process, and thereby increasing the efficiency of the overall Fischer-Tropsch process.

The invention also relates to a process as described above, followed by a hydroconversion reaction and distillation to obtain specific hydrocarbon fraction. Suitable hydroconversion reactions are hydrocracking, hydroisomerisation, hydrogenation and catalytic dewaxing. Specific hydrocarbon fractions are for instance LPG, naphtha, detergent feedstock, solvents, drilling fluids, kerosene, gasoil, base oil and waxes.

What is claimed is:

1. A multi-stage process for the production of hydrocarbon products from syngas, said process comprising
    feeding syngas to a multi-stage system comprising
    1) a first stage comprising one or more syngas conversion reactors in which syngas is partially converted into hydrocarbon products at conversion conditions each conversion reactor having a syngas entry stream system which system combines two or more entry streams of syngas and which system delivers the combined syngas to the syngas conversion reactor, the syngas entry system combining at least one entry stream of syngas being a syngas stream obtained in a partial oxidation process and having a hydrogen/carbon monoxide ($H_2/CO$) ratio between 1.6 and 2.0 and with another syngas stream being a recycle stream from the conversion reactor having an $H_2/CO$ ratio between 0.2 and 0.9, the combined syngas having an $H_2/CO$ ratio between 1.0 and 1.6; and
    2) at least one additional stage, each additional stage comprising one or more syngas conversion reactors in which syngas is partially converted into hydrocarbon products at conversion conditions each conversion reactor having a syngas entry stream system which system combines three or more entry streams of syngas and which system delivers the combined syngas to the syngas conversion reactor(s), the syngas entry system combining an exit stream of syngas from the previous stage, the $H_2/CO$ ratio of the exit stream of syngas being between 0.2 and 0.9, a recycle stream from the additional stage having an $H_2/CO$ ratio between 0.2 and 0.9, together with a reformed syngas having an $H_2/CO$ ratio of at least 3.0, the combined syngas having an $H_2/CO$ ratio between 1.0 and 1.6.

2. A process as claimed in claim 1, wherein one or more stages of the process comprises two or more reactors operating in parallel.

3. A process as claimed in claim 1, wherein the multi-stage process comprises two or three stages.

4. A process as claimed in claim 1, wherein each stage of the process comprises between two and four times the number of reactors compared to the next stage.

5. A process as claimed in claim 1, wherein the reformed syngas is provided by a steam methane reforming process.

6. A process as claimed in claim 1, wherein the percentage conversion of carbon monoxide in each stage of the process is in the range of 70-90% wt.

7. A process as claimed in claim 1, wherein the process includes a catalyst comprising one or more metals from Group VIII of the Periodic Table.

8. A process as claimed in claim 7, in which the catalyst in the first stage, is a cobalt base catalyst comprising a C5+ enhancing promoter, especially a non-noble metal.

9. A process as claimed in claim 1, wherein one or more stages of the process is carried out at a temperature in the range from 125° to 350° C., and at a pressure in the range from 5 to 150 bar.

10. A process as claimed in claim 1, followed by a hydroconversion reaction and distillation to obtain specific hydrocarbon fraction.

* * * * *